United States Patent

Nakamura

[11] 4,234,242
[45] Nov. 18, 1980

[54] GAUSS TYPE PHOTOGRAPHIC LENS

[75] Inventor: Soichi Nakamura, Kamakura, Japan

[73] Assignee: Nippon Kogaku K.K., Tokyo, Japan

[21] Appl. No.: 7,775

[22] Filed: Jan. 30, 1979

[30] Foreign Application Priority Data

Feb. 3, 1978 [JP] Japan .................. 53-10525

[51] Int. Cl.³ .................................... G02B 9/60
[52] U.S. Cl. ...................................... 350/218
[58] Field of Search ......................... 350/218

[56] References Cited

U.S. PATENT DOCUMENTS

| | | | |
|---|---|---|---|
| 3,738,736 | 6/1973 | Shimizu | 350/215 |
| 4,131,335 | 12/1978 | Kimura | 350/218 |
| 4,139,265 | 2/1979 | Matsui | 350/218 |

*Primary Examiner*—John K. Corbin
*Assistant Examiner*—Scott J. Sugarman
*Attorney, Agent, or Firm*—Shapiro and Shapiro

[57] ABSTRACT

A Gauss type photographic lens comprises a first convergent lens group G1 and a second convergent lens group G2. The first convergent lens group G1 comprises, in the order from the object side, a positive lens component L1, a positive meniscus lens component L2 having its convex surface facing the object side, and a negative meniscus lens component L3 having its convex surface facing the object side, and the second convergent lens group G2 comprises, in the order from the object side, a meniscus lens component L4 consisting of a negative lens and a positive lens cemented together and having its concave surface facing the object side, and a positive lens component L5.

Such a lens arrangement is well-known and to maintain the lens construction more compact and better correct the various aberrations, it is necessary that conditions be satisfied.

5 Claims, 14 Drawing Figures

GAUSS TYPE PHOTOGRAPHIC LENS

BACKGROUND OF THE INVENTION

1. Field of the Invention

This invention relates to a compact Gauss type photographic lens.

2. Description of the Prior Art

Gauss type photographic lenses have been used since early days and numerous examples of the design of the Gauss type photographic lens having a high performance are known. However, it is very difficult to design a Gauss type lens having a certain extent of wide angle of view and bright and yet having a sufficiently long back focal length but having a short entire length (the length from the foremost surface of the lens to the film surface), and how to make the lens compact while maintaining a good image forming performance has been a great task to be solved in the photographic lens of this type.

SUMMARY OF THE INVENTION

It is an object of the present invention to provide a Gauss type photographic lens for use with a single-lens reflex camera which has a high image forming performance and which is bright and compact.

Generally, a Gauss type photographic lens is characterized in that meniscus-shaped lenses are disposed on the opposite sides of a diaphragm space with their concave surfaces opposed to each other and that positive lenses are disposed on the opposite sides of the meniscus-shaped lenses. In the present invention, such a Gauss type photographic lens is divided into a lens group adjacent to the object side and a lens group adjacent to the image side with the diaphragm space as the boundary, and these lens groups are regarded as a first convergent lens group G1 having a composite focal length f1 and a second convergent lens group G2 having a composite focal length f2, and from such a point of view, the nature of the Gauss type photographic lens is re-evaluated and the optical conditions for reducing the entire length of the lens have been analyzed.

The invention will become more fully apparent from the following description thereof taken in conjunction with the accompanying drawings.

DESCRIPTION OF THE PREFERRED EMBODIMENTS

Figure 1:
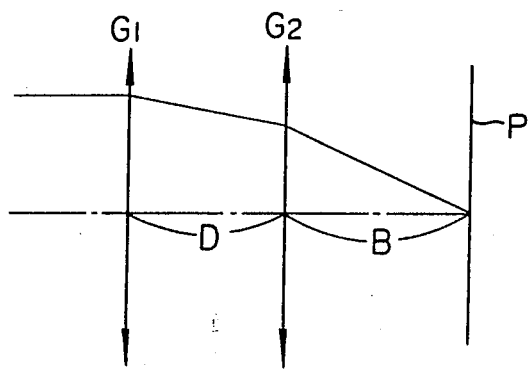
FIG. 1 shows a lens construction in which a first convergent lens group and a second convergent lens group of the present invention are regarded as thin lenses.

Referring to FIG. 1, it shows a construction in which a first convergent lens group G1 and a second convergent lens group G2 are regarded as thin lenses. As shown, the distance between the principal planes of the two groups is D and the length from the principal plane of the rear group to the focal plane P is B. Here, the total focal length f of the entire system is expressed as follows as is well-known:

$$\frac{1}{f} = \frac{1}{f_1} + \frac{1}{f_2} - \frac{D}{f_1 \cdot f_2} \tag{1}$$

The value of B is the back focal length in the basic construction comprising this thin system and is expressed as:

$$B = f\left(1 - \frac{D}{f_1}\right) \tag{2}$$

When considering a desire for making compact the entire lens, it is obvious that it is advantageous to bring the first G1 and the second convergent lens group G2 as close to each other as possible, namely, minimize the value of D. However, it has been discussed in the designing of Gauss type lenses that adoption of such a construction accompanies increased coma in the intermediate portion of the picture plane which in turn leads to the tendency toward aggravation of the image forming performance, and it has been extremely difficult to positively make small the value of D to make the lens compact and yet maintain an excellent performance. In contrast, the present invention provides a maximum condition for making the lens compact and yet maintain an excellent image forming performance by the formulas as shown below:

$$0.98f < D < 1.05f \tag{3}$$

$$2.5f < f_1 < 3.0f \tag{4}$$

where D is the distance between the principal planes of the first G1 and the second convergent lens group G2 and f1 is the composite focal length of the first lens group G1.

These conditions will hereinafter be discussed. First, if D is smaller than the lower limit in expression (3), the diaphragm space becomes narrow and the lenses forming this space are disposed with their concave surface opposed to each other, so that it is difficult to insert a diaphragm therein, or the radii of curvature of these opposed concave surfaces are compelled to be great, thus making it difficult to maintain the Petzval sum of the entire system at a small value. If D is greater than the upper limit in conditions (3), it is essentially difficult to make compact the Gauss type lens of this kind. It is formula (4) which determines the power distribution of the first G1 and the second lens group G2 in formula (3), and if f1 is determined as shown in formula (4) in addition to formula (3), f2 is necessarily determined by the basic relation of equation (1). If f1 is smaller than the lower limit in formula (4), the value of B becomes smaller as seen from equation (2) and necessarily, the so-called back focal length becomes short.

It is possible to increase the back focal length by intensifying the bending of a meniscus lens component which is present in the second lens group G2 and which is concave with respect to the object side, but in such case it is impossible to provide a sufficient back focal length as a lens for single-lens reflex cameras unless the radius of curvature of the concave surface of that meniscus lens component which forms the diaphragm space is considerably intensified and as the result, occurrence of the coma in this surface becomes so remarkable that it is difficult to correct the coma at the intermediate angle of view. Otherwise, the distance between the two lens groups must be widened and this means that D is increased beyond the upper limit in formula (3), and it departs from the object of the present invention. Also, if $f_1$ is greater, the value of B becomes greater from equation (2) but is it is greater than the upper limit, the actual back focal length becomes unnecessarily long to make it difficult to reduce the distance from the foremost surface to the rearmost surface of the lens.

Figure 2:
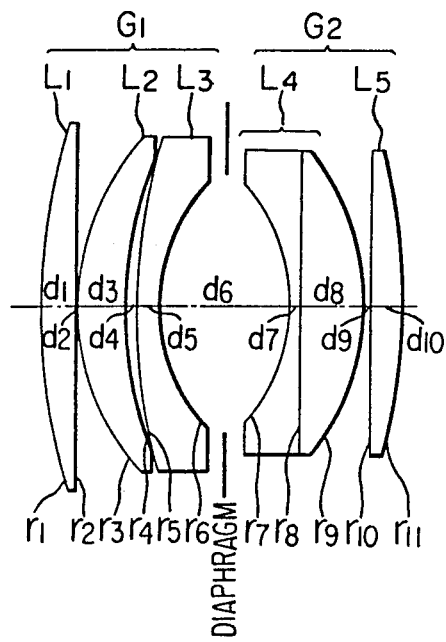
FIG. 2 shows a specific example of the construction of FIG. 1.
Figure 3A:
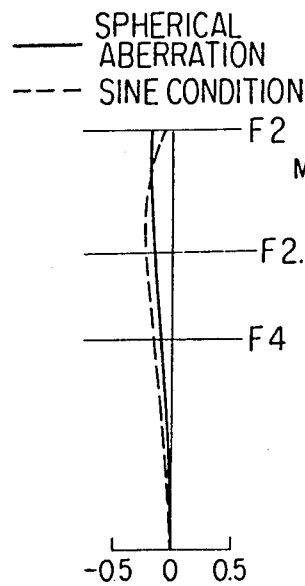
FIGS. 3A to 6C illustrate various aberrations in respective lens systems.
Figure 3B:
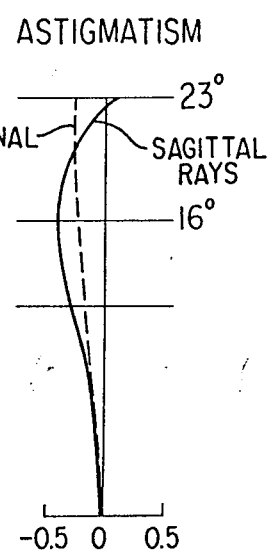
Figure 3C:
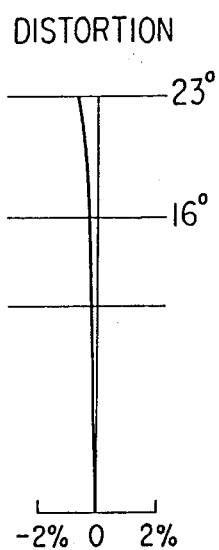
Figure 4A:
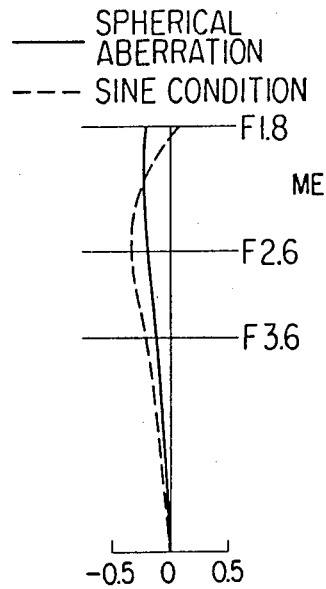
Figure 4B:
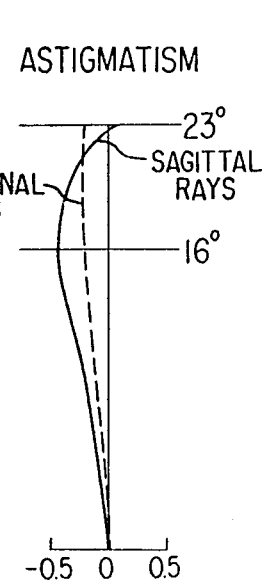
Figure 4C:
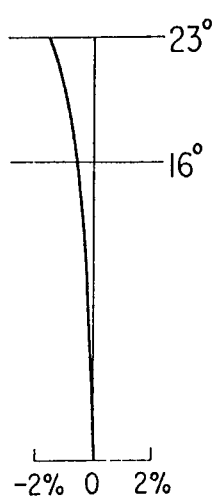
Figure 5A:
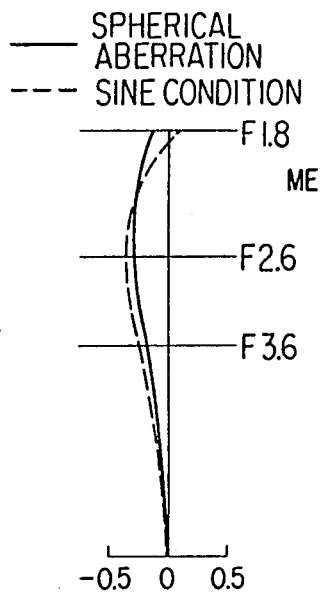
Figure 5B:
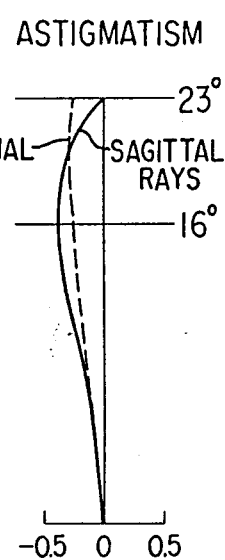
Figure 5C:
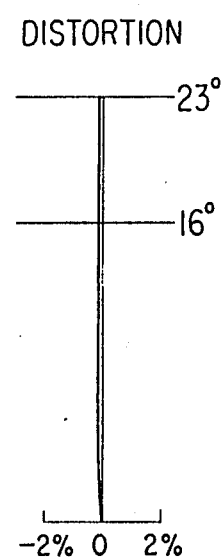
Figure 6A:
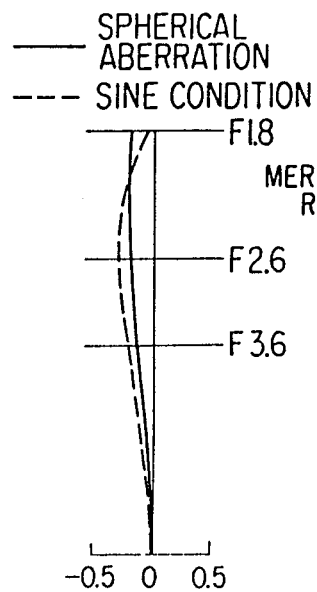
Figure 6B:
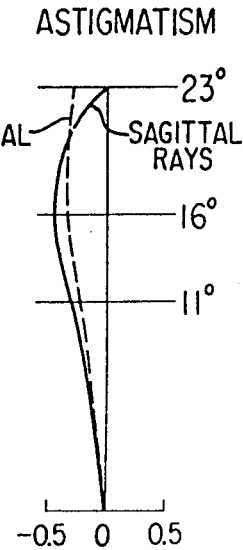
Figure 6C:
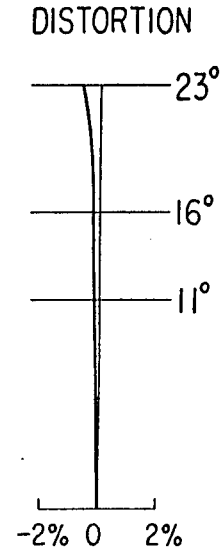

The framework for keeping the Gauss type photographic lens compact and at high performance is determined by the above-described conditions for the basic construction and in the present invention, the lens construction as shown in FIG. 2 is specifically adopted for the first G1 and the second convergent lens group G2. The first convergent lens group G1 comprises, in the order from the object side, a positive lens component L1, a positive meniscus lens component 12 having its convex surface facing the object side, and a negative meniscus lens component L3 having its convex surface facing the object side, and the second convergent lens group G2 comprises, in the order from the object side, a meniscus lens component L4 consisting of a negative lens and a positive lens cemented together and having its concave surface facing the object side, and a positive lens component L5.

Such a lens arrangement is well-known and to maintain the lens construction more compact and better correct the various aberrations, it is necessary that the following further conditions be satisified:

$$0.06 f_1 < D_1 < 0.08 f_1 \quad (5)$$
$$0.16 f_2 < D_2 < 0.018 f_2 \quad (6)$$
$$\frac{n_3}{n_2} \geq \frac{n_4}{n_5} \quad (7)$$
$$\left. \begin{array}{l} 1.62 < \dfrac{n_3 + n_4}{2} < 1.70 \\ 27 < \nu_3, \nu_4 < 37 \end{array} \right\} \quad (8)$$
$$\left. \begin{array}{l} 1.70 < n_1, n_2, n_5, n_6 < 1.90 \\ 40 < \nu_1, \nu_2, \nu_5, \nu_6 < 55 \end{array} \right\} \quad (9)$$
$$0.2 f_1 < r_4 < 0.3 f_1 \quad (10)$$
$$0.5 f_1 < r_5 < 0.7 f_1 \quad (11)$$
$$0.31 f_2 < r_7 < 0.37 f_2 \quad (12)$$
$$\left. \begin{array}{l} r_8 < 0 \\ |3 r_7| < |r_8| \end{array} \right\} \quad (13)$$

where D1 is the length from the foremost lens surface to the rearmost lens surface of the first convergent lens group, D2 the length from the foremost lens surface to the rearmost lens surface of the second convergent lens group, r the radius of curvature of each lens surface, n the refractive index of each lens, $\nu$ the Abbe number of each lens, and subscript numbers represent the order from the object side.

Significances of these conditions will hereinafter be described.

First, conditions (5) and (6) are for prescribing the actual lens thicknesses of the first convergent lens group G1 and the second convergent lens group G2. If the lower limits in these two conditions are departed from, the lens should theoretically be compact but actually, the marginal thickness of each lens is small and a sufficient effective diameter becomes difficult to obtain. If the upper limits in these conditions are exceeded, correction of the various aberrations becomes advantageous but in the actual optical system, the entire length thereof becomes long and this does not meet the object of the present invention.

Conditions (7), (8) and (9) are for choosing the glass material. Condition (7) determines the range of glass selection chiefly for well effecting a high order of achromatism in the positive meniscus lens component L2 of the first convergent group G1 having its convex surface facing the object side and the negative meniscus lens component L3 of the first convergent group G1 having its convex surface facing the object side and in the cemented lens component L4 of the second convergent group G2 having its concave surface facing the object side. In the first convergent group G1, a smaller difference between the refractive indedx $n_2$ of said positive meniscus lens component and the refractive index $n_3$ of said negative meniscus lens component makes it easier to correct a high degree of chromatic aberration, namely, chromatic variation of spherical aberration occurring in the lens construction of this type. At this time, however, the Petzval sum in the first convergent group G1 tends to become positive and it is therefore necessary to select a small refractive index $n_4$ for the negative lens forming said cemented meniscus lens component in the second convergent group G2 and a great refractive index $n_5$ for the positive lens to thereby increase the difference in refractive index between the two lens components and to construct the lens system so as to satisfy at least condition (7). Conditions (8) and (9) are concerned with all the lens components in the Gauss type photographic lens adopted herein and are necessary to well maintain the Petzval sum and correction of the chromatic aberration of the entire system, in addition to the satisfaction of the aforementioned conditions. If these conditions are departed from, the plurality of the image plane cannot be kept and the chromatic aberration becomes difficult to correct and the conditions imposed on the refractive index are important because the Petzval sum essentially tends to increase to the positive in the above-described limited lens construction.

Conditions (10) and (11) are concerned with the radius of curvature of the image side surface of the positive meniscus lens component L2 in the first convergent group G1 having its convex surface facing the object side and the radius of curvature of the object side surface of the negative meniscus lens component L3 having its convex surface facing the object side, and these conditions are for prescribing that the air lens formed between the two lens components L2 and L3 under the above-described conditions has an appropriate diverging action in the meniscus shape having its convex surface facing the object side and for better correcting a high order of chromatic aberration. If the upper limits in these conditions are exceeded, the condition (7) is satisfied but the chromatic variations of the spherical aberration by the respective surfaces are increased and become difficult to well correct even by the other lens components. If the lower limits in these conditions are departed from, the achromatism by these two lens components must be effected by increasing the difference in refractive index and this departs from the condition (7). Moreover, in this case, the Petzval sum increases to the positive and becomes difficult to correct sufficiently well.

Condition (2) is for determining the radius of curvature of the surface concave with respect to the object side which lies most toward the object side in the second convergent lens group G2 and which forms the diaphragm space, and as already mentioned in the description of the basic construction, condition (12) is intended to well correct the coma while obtaining an appropriate back focal length. If the upper limit in this condition is exceeded, the diverging action becomes too weak so that the Petzval sum increases to the positive to remarkably intensify the negative curvature of field. If the lower limit in this condition is departed from, occurrence of the coma in the intermediate angle of view becomes pronounced and difficult to well correct even by the other components.

Condition (13) is for determining the magnitude of the curvature radius $r_8$ of the cemented surface of the cemented meniscus lens component L4 of the second convergent group having its concave surface facing the object side and for effectively effecting achromatism by this lens component. If the cemented surface $r_8$ becomes positive, namely, a surface convex with respect to the object side, the variation in chromatic difference of magnification by the angle of view becomes pronounced and difficult to well correct in the entire picture plane and at the same time, the chromatic variation of the spherical aberration becomes pronounced because condition (7) provides a difference in refractive index between the positive and the negative lens forming the cemented lens component. On the other hand, if the value of $|r_8|$ becomes smaller than the value of $|3r_7|$, the Abbe number of the negative lens forming this cemented lens component must be made smaller and the Abbe number of the positive lens must be made greater to effect achromatism, and this exceeds conditions (8) and (9) necessary for the correction of the Petzval sum.

In addition to the above-described conditions, the following condition on the shape factor of the positive lens component L5 of the second convergent lens group G2 should desirably be satisfied.

$$-0.8 < \frac{r_{11} + r_{10}}{r_{11} - r_{10}} < 0.15 \quad (13)$$

If the lower limit in this condition is departed from, the unbalance between the spherical aberration and the astigmatism in this lens component becomes pronounced and difficult to correct by the other lens components. On the other hand, if the upper limit in this condition is exceeded, the asymmetry of the shape of the entire optical system is increased to provide occurrence of great negative distortion and expedite the aggravation of the performance during close-up photography.

Numerical data for various examples of the Gauss type photographic lens according to the present invention will be shown below. In the table of numerical data for each example, r represents the curvature radius of each lens surface, d the air separation between adjacent lens surfaces and the center thickness of each lens, n and $\nu$ represent the refractive index and Abbe number of each lens, respectively, and the subscript numbers represent the order from the objective side.

EXAMPLE 1

| Focal length f = 100 mm Relative aperture 1 : 2.0 Angle of view 2ω = 46° | | | |
|---|---|---|---|
| $r_1 = 88.702$ | $d_1 = 6.78$ | $n_1 = 1.713$ | $\nu_1 = 53.9$ |
| $r_2 = 3682.171$ | | | |
| | $d_2 = 0.19$ | | |
| $r_3 = 37.399$ | $d_3 = 8.72$ | $n_2 = 1.713$ | $\nu_2 = 53.9$ |
| $r_4 = 61.587$ | | | |

(G1)

-continued

| Focal length f = 100 mm Relative aperture 1 : 2.0 Angle of view 2ω = 46° | | | |
|---|---|---|---|
| | $d_4 = 2.71$ | | |
| $r_5 = 188.525$ | $d_5 = 1.94$ | $n_3 = 1.64831$ | $\nu_3 = 33.8$ |
| $r_6 = 31.585$ | | | |
| | $d_6 = 15.70$ | | |
| $r_7 = -35.134$ | $d_7 = 1.94$ | $n_4 = 1.64831$ | $\nu_4 = 33.8$ |
| $r_8 = -112.118$ | $d_8 = 9.63$ | $n_5 = 1.713$ | $\nu_5 = 53.9$ |
| $r_9 = -39.574$ | | | |
| | $d_9 = 0.19$ | | |
| $r_{10} = 156.498$ | $d_{10} = 5.62$ | $n_6 = 1.713$ | $\nu_6 = 53.9$ |
| $r_{11} = -226.066$ | | | |

(G2)

Back focal length: Bf=74.8
Entire length=$d_1 + d_2' \ldots + d_{10} + Bf = 128.3$ $f_1 = 274.5$ $f_2 = 100.7$ $D = 98.8$ $D_1 = 20.3 = 0.074 f_1$ $D_2 = 17.4 = 0.17 f_2$

EXAMPLE 2

| Focal length f = 100 mm Relative aperture 1 : 1.8 Angle of view 2ω = 46° | | | |
|---|---|---|---|
| $r_1 = 90.983$ | $d_1 = 6.78$ | $n_1 = 1.713$ | $\nu_1 = 53.9$ |
| $r_2 = 1224.651$ | | | |
| | $d_2 = 0.19$ | | |
| $r_3 = 38.186$ | $d_3 = 8.72$ | $n_2 = 1.713$ | $\nu_2 = 53.9$ |
| $r_4 = 64.196$ | | | |
| | $d_4 = 3.10$ | | |
| $r_5 = 176.021$ | $d_5 = 1.94$ | $n_3 = 1.64831$ | $\nu_3 = 33.8$ |
| $r_6 = 32.091$ | | | |
| | $d_6 = 17.64$ | | |
| $r_7 = -35.039$ | $d_7 = 1.94$ | $n_4 = 1.64831$ | $\nu_4 = 33.8$ |
| $r_8 = -130.233$ | $d_8 = 9.69$ | $n_5 = 1.713$ | $\nu_5 = 53.9$ |
| $r_9 = -39.922$ | | | |
| | $d_9 = 0.19$ | | |
| $r_{10} = 141.924$ | $d_{10} = 5.04$ | $n_6 = 1.713$ | $\nu_6 = 53.9$ |
| $r_{11} = -235.310$ | | | |

Back Focal length: Bf=75.0
Entire length=$d_1 + d_2 + \ldots + d_{10} + Bf = 130.3$ $f_1 = 290.5$ $f_2 = 98.1$ $D = 103.5$ $D_1 = 20.7 = 0.071 f_1$ $D_2 = 16.9 = 0.172 f_2$

EXAMPLE 3

| Focal length f = 100 mm Relative aperture 1 : 1.8 Angle of view 2ω = 46° | | | |
|---|---|---|---|
| $r_1 = 97.968$ | $d_1 = 6.79$ | $n_1 = 1.76682$ | $\nu_1 = 46.81$ |
| $r_2 = 3352.693$ | | | |
| | $d_2 = 0.19$ | | |
| $r_3 = 38.776$ | $d_3 = 8.05$ | $n_2 = 1.79713$ | $\nu_2 = 45.62$ |
| $r_4 = 66.579$ | | | |
| | $d_4 = 2.52$ | | |
| $r_5 = 134.941$ | $d_5 = 1.94$ | $n_3 = 1.71714$ | $\nu_3 = 29.49$ |

-continued

| Focal length f = 100 mm Relative aperture 1 : 1.8 Angle of view 2ω = 46° | | | | |
|---|---|---|---|---|
| $r_6 = 31.254$ | | | | |
| | $d_6 = 22.199$ | | | |
| $r_7 = -32.533$ | $d_7 = 1.94$ | $n_4 = 1.64841$ | $\nu_4 = 1.6733$ | |
| $r_8 = -423.785$ | $d_8 = 9.60$ | $n_5 = 1.76682$ | $\nu_5 = 46.81$ | |
| G2 $r_9 = -40.463$ | | | | |
| | $d_9 = 0.19$ | | | |
| $r_{10} = 760.402$ | $d_{10} = 5.53$ | $n_6 = 1.71313$ | $\nu_6 = 53.94$ | |
| $r_{11} = -104.405$ | | | | |

Back focal length: Bf=74.2
Entire length = $d_1+d_2+ \ldots +d_{10}+Bf = 133.2$ $f_1 = 261.3$ $f_2 = 99.9$ $D = 100.1$ $D_1 = 19.5 = 0.075 f_1$ $D_2 = 17.3 = 0.173 f_2$

EXAMPLE 4

| Focal length f = 100 mm Relative Aperture 1 : 1.8 Angle of view 2 = 46° | | | | |
|---|---|---|---|---|
| $r_1 = 87.791$ | $d_1 = 6.78$ | $n_1 = 1.713$ | $\nu_1 = 53.9$ | |
| $r_2 = 2363.198$ | | | | |
| | $d_2 = 0.19$ | | | |
| $r_3 = 39.438$ | $d_3 = 8.72$ | $n_2 = 1.713$ | $\nu_2 = 53.9$ | |
| G1 $r_4 = 64.341$ | | | | |
| | $d_4 = 3.10$ | | | |
| $r_5 = 184.109$ | $d_5 = 1.94$ | $n_3 = 1.64831$ | $\nu_3 = 33.8$ | |
| $r_6 = 32.752$ | | | | |
| | $d_6 = 17.64$ | | | |
| $r_7 = -33.411$ | $d_7 = 1.94$ | $n_4 = 1.62004$ | $\nu_4 = 36.3$ | |
| $r_8 = -251.938$ | $d_8 = 9.69$ | $n_5 = 1.713$ | $\nu_5 = 53.9$ | |
| G2 $r_9 = -39.922$ | | | | |
| | $d_9 = 0.19$ | | | |
| $r_{10} = 208.907$ | $d_{10} = 5.04$ | $n_6 = 1.713$ | $\nu_6 = 53.9$ | |
| $r_{11} = -160.368$ | | | | |

Back focal length: Bf=74.7
Entire length = $d_1+d_2+ \ldots +d_{10}+Bf = 130.0$ $f_1 = 275.1$ $f_2 = 99.6$ $D = 100.8$ $D_1 = 20.7 = 0.075 f_1$ $D_2 = 16.9 = 0.170 f_2$ The various aberrations in the examples of the lens system shown above are illustrated in FIGS. 3 to 6 in succession. As seen from these Figures, each example is of compact lens and yet has a high image forming performance.

According to the present invention, as has hitherto been described, there is achieved a Gauss type photographic lens which is compact and yet bright and has a sufficient resolving power and contrast even in an open aperture condition and which is excellent as the lens for a single-lens reflex camera. More specifically, there is provided a bright Gauss type photographic lens which has a back focal length at least 0.73 times the focal length for an angle of view of the order of 46° and an entire lens length below 1.35 times the focal length and yet has a relative aperture of 1:1.8.

I claim:

1. A Gauss type photographic lens comprising, in the order from the object side, a positive lens component, a positive meniscus lens component having its convex surface facing the object side, a negative meniscus lens having its convex surface facing the object side, a diaphragm, a meniscus lens component comprising a negative lens and a positive lens cemented together and having its concave surface facing the object side, and a positive lens component, wherein the total focal length of the entire system is f, the lens components adjacent to the object side with respect to the diaphragm forms a first convergent lens group having a composite focal length $f_1$, and the lens components adjacent to the image side with respect to the diaphragm forms a second convergent lens group having a composite focal length $f_2$, said photographic lens satisfying the following two conditions:

$$0.9f < D < 1.05f \quad (a)$$

$$2.5f < f_1 < 3.0f \quad (b)$$

where D is the distance between the principal points of said two lens groups, said photographic lens further satisfying the following conditions:

$$0.06 f_1 < D_1 < 0.08 f_1 \quad (c)$$
$$0.16 f_2 < D_2 < 0.18 f_2 \quad (d)$$
$$\frac{n_3}{n_2} \geq \frac{n_4}{n_5} \quad (e)$$

$$\left. \begin{array}{l} 1.62 < \dfrac{n_3 + n_4}{2} < 1.70 \\ 27 < \nu_3, \nu_4 < 37 \end{array} \right\} \quad (f)$$

$$\left. \begin{array}{l} 1.70 < n_1, n_2, n_5, n_6 < 1.90 \\ 40 < \nu_1, \nu_2, \nu_5, \nu_6 < 55 \end{array} \right\} \quad (g)$$

$$0.2 f_1 < r_4 < 0.3 f_1 \quad (h)$$
$$0.5 f_1 < r_5 < 0.7 f_1 \quad (i)$$
$$0.3 f_2 < |r_7| < 0.37 f_2 \quad (j)$$
$$r_8 < 0 \quad (k)$$
$$|3R_7| < |r_8|$$

where D1 represents the length from the foremost lens surface to the rearmost lens surface of the first convergent lens group, D2 the length from the foremost lens surface to the rearmost lens surface of the second convergent lens group, r the curvature radius of each lens surface, n and ν represent the refractive index and the Abbe number, respectively, of each lens, and subscript numbers represent the order from the object side.

2. A Gauss type photographic lens according to claim 1, having the numerical data substantially as set forth in the following table:

| Focal length f = 100 mm Relative aperture 1 : 2.0 Angle of view 2ω = 46° | | | | |
|---|---|---|---|---|
| $r_1 = 88.702$ | $d_1 = 6.78$ | $n_1 = 1.713$ | $\nu_1 = 53.9$ | |
| $r_2 = 6682.171$ | | | | |
| | $d_2 = 0.19$ | | | |
| $r_3 = 37.399$ | $d_3 = 8.72$ | $n_2 = 1.713$ | $\nu_2 = 53.9$ | |
| G1 $r_4 = 61.587$ | | | | |
| | $d_4 = 2.71$ | | | |
| $r_5 = 188.525$ | $d_5 = 1.94$ | $n_3 = 1.64831$ | $\nu_3 = 33.8$ | |
| $r_6 = 31.585$ | | | | |
| | $d_6 = 15.70$ | | | |
| $r_7 = -35.134$ | $d_7 = 1.94$ | $n_4 = 1.64831$ | $\nu_4 = 33.8$ | |
| $r_8 = -112.118$ | $d_8 = 9.63$ | $n_5 = 1.713$ | $\nu_5 = 53.9$ | |

-continued

| | | | | |
|---|---|---|---|---|
| G1 | $r_9 = -39.574$ | | | |
| | | $d_9 = 0.19$ | | |
| | $r_{10} = 156.498$ | $d_{10} = 5.62$ | $n_6 = 1.713$ | $v_6 = 53.9$ |
| | $r_{11} = -226.066$ | | | |

Back focal length: $Bf = 74.8$
Entire length $= d_1 + d_2 + \ldots + d_{10} + Bf = 128.3$ $f_1 = 274.5$ $f_2 = 100.7$ $D = 98.8$ $D_1 = 20.3 = 0.074 f_1$ $D_2 = 17.4 = 0.173 f_2$ wherein r represents the curvature radius of each lens surface, d the air separation between adjacent lens surfaces and the center thickness of each lens, n and $v$ represent the refractive index and Abbe number of each lens, respectively, and the subscript numbers represent the order from the objective side.

3. A Gauss type photographic lens according to claim 1, having the numerical data substantially as set forth in the following table:

| Focal length f = 100 mm Relative aperture 1 : 1.8 Angle of view 2ω = 46° | | | | |
|---|---|---|---|---|
| G1 | $r_1 = 90.983$ $r_2 = 1224.651$ | $d_1 = 6.78$ | $n_1 = 1.713$ | $v_1 = 53.9$ |
| | | $d_2 = 0.19$ | | |
| | $r_3 = 38.186$ $r_4 = 64.196$ | $d_3 = 8.72$ | $n_2 = 1.713$ | $v_2 = 53.9$ |
| | | $d_4 = 3.10$ | | |
| | $r_5 = 176.021$ $r_6 = 32.091$ | $d_5 = 1.94$ | $n_3 = 1.64831$ | $v_3 = 33.8$ |
| | | $d_6 = 17.64$ | | |
| G2 | $r_7 = -35.039$ $r_8 = -130.233$ $r_9 = -39.922$ | $d_7 = 1.94$ $d_8 = 9.69$ | $n_4 = 1.64831$ $n_5 = 1.713$ | $v_4 = 33.8$ $v_5 = 53.9$ |
| | | $d_9 = 0.19$ | | |
| | $r_{10} = 141.924$ $r_{11} = -235.310$ | $d_{10} = 5.04$ | $n_6 = 1.713$ | $v_6 = 53.9$ |

Back focal length: $Bf = 75.0$
Entire length $= d_1 + d_2 + \ldots + d_{10} + Bf = 130.3$ $f_1 = 290.5$ $f_2 = 98.1$ $D = 103.5$ $D_1 = 20.7 = 0.071 f_1$ $D_2 = 16.9 = 0.172 f_2$ wherein r represents the curvature radius of each lens surface, d the air separation between adjacent lens surfaces and the center thickness of each lens, n and $v$ represent the refractive index and Abb number of each lens, respectively, and the subscript numbers represent the order from the objective side.

4. A Gauss type photographic lens according to claim 1, having the numerical data substantially as set forth in the following table:

| Focal length f = 100 mm Relative aperture 1 : 1.8 Angle of view 2ω = 46° | | | | |
|---|---|---|---|---|
| G1 | $r_1 = 97.968$ $r_2 = 3352.693$ | $d_1 = 6.79$ | $n_1 = 1.76682$ | $v_1 = 46.81$ |
| | | $d_2 = 0.19$ | | |
| | $r_3 = 38.776$ $r_4 = 66.579$ | $d_3 = 8.05$ | $n_2 = 1.79713$ | $v_2 = 45.62$ |
| | | $d_4 = 2.52$ | | |
| | $r_5 = 134.941$ $r_6 = 31.254$ | $d_5 = 1.94$ | $n_3 = 1.71714$ | $v_3 = 29.49$ |
| | | $d_6 = 22.199$ | | |
| G2 | $r_7 = -32.533$ $r_8 = -423.785$ $r_9 = -40.463$ | $d_7 = 1.94$ $d_8 = 9.60$ | $n_4 = 1.64841$ $n_5 = 1.76682$ | $v_4 = 1.6733$ $v_5 = 46.81$ |
| | | $d_9 = 0.19$ | | |
| | $r_{10} = 760.402$ $r_{11} = -104.405$ | $d_{10} = 5.53$ | $n_6 = 1.71313$ | $v_6 = 53.94$ |

Back focal length: $Bf = 74.2$
Entire length $= d_1 + d_2 + \ldots + d_{10} + Bf = 133.2$ $f_1 = 261.3$ $f_2 = 99.9$ $D = 100.1$ $D_1 = 19.5 = 0.075 f_1$ $D_2 = 17.3 = 0.173 f_2$ wherein r represents the curvature radius of each lens surface, d the air separation between adjacent lens surfaces and the center thickness of each lens, n and $v$ represent the refractive index and Abbe number of each lens, respectively, and the subscript numbers represent the order from the objective side.

5. A Gauss type photographic lens according to claim 1, having the numerical data substantially as set forth in the following table:

| Focal length f = 100 mm Relative Aperture 1 : 1.8 Angle of view 2 = 46° | | | | |
|---|---|---|---|---|
| G1 | $r_1 = 87.791$ $r_2 = 2363.198$ | $d_1 = 6.78$ | $n_1 = 1.713$ | $v_1 = 53.9$ |
| | | $d_2 = 0.19$ | | |
| | $r_3 = 39.438$ $r_4 = 64.341$ | $d_3 = 8.72$ | $n_2 = 1.713$ | $v_2 = 53.9$ |
| | | $d_4 = 3.10$ | | |
| | $r_5 = 184.109$ $r_6 = 32.752$ | $d_5 = 1.94$ | $n_3 = 1.64831$ | $v_3 = 33.8$ |
| | | $d_6 = 17.64$ | | |
| G2 | $r_7 = -33.411$ $r_8 = -251.938$ $r_9 = -39.922$ | $d_7 = 1.94$ $d_8 = 9.69$ | $n_4 = 1.62004$ $n_5 = 1.713$ | $v_4 = 36.3$ $v_5 = 53.9$ |
| | | $d_9 = 0.19$ | | |
| | $r_{10} = 208.907$ $r_{11} = -160.368$ | $d_{10} = 5.04$ | $n_6 = 1.713$ | $v_6 = 53.9$ |

Back focal length: $Bf = 74.7$
Entire length $= d_1 + d_2 + \ldots d_{10} + Bf = 130.0$ $f_1 = 275.1$ $f_2 = 99.6$ $D = 100.8$ $D_1 = 20.7 = 0.075 f_1$ $D_2 = 16.9 = 0.170 f_2$ where r represents the curvature radius of each lens surface, d the air separation between adjacent lens surfaces and the center thickness of each lens, n and $v$ represent the refractive index and Abbe number of each lens, respectively, and the subscript numbers represent the order from the objective side.

* * * * *

UNITED STATES PATENT AND TRADEMARK OFFICE
CERTIFICATE OF CORRECTION

PATENT NO. : 4,234,242
DATED : November 18, 1980
INVENTOR(S) : Nakamura

It is certified that error appears in the above-identified patent and that said Letters Patent are hereby corrected as shown below:

Column 7, line 6, Example 3, change "$n_4 = 1.64841$" to -- $n_4 = 1.64831$ --; and change "$\nu_4 = 1.6733$" to -- $\nu_4 = 33.8$ --.

Column 10, line 11, Claim 4, change "$n_4 = 1.64841$" to -- $n_4 = 1.64831$ --; and change "$\nu_4 = 1.6733$" to -- $\nu_4 = 33.8$ --.

Signed and Sealed this

Fourteenth Day of April 1981

[SEAL]

Attest:

RENE D. TEGTMEYER

Attesting Officer

Acting Commissioner of Patents and Trademarks